(12) United States Patent
Linderman

(10) Patent No.: US 10,581,632 B2
(45) Date of Patent: Mar. 3, 2020

(54) DATA TRANSFER FILTER

(71) Applicant: Government of the United States, as represented by the Secretary of the Air Force, Rome, NY (US)

(72) Inventor: Mark Herron Linderman, Rome, NY (US)

(73) Assignee: Goverrnment of the United States of America as Represented by the Secretary of The Air Force, Washington, DC (US)

( * ) Notice: Subject to any disclaimer, the term of this patent is extended or adjusted under 35 U.S.C. 154(b) by 204 days.

(21) Appl. No.: 15/475,195

(22) Filed: Mar. 31, 2017

(65) Prior Publication Data
US 2018/0076971 A1 Mar. 15, 2018

Related U.S. Application Data

(60) Provisional application No. 62/393,738, filed on Sep. 13, 2016.

(51) Int. Cl.
*H04L 12/40* (2006.01)
*G06F 13/42* (2006.01)
*G06F 13/40* (2006.01)

(52) U.S. Cl.
CPC ........ *H04L 12/4013* (2013.01); *G06F 13/404* (2013.01); *G06F 13/4072* (2013.01); *G06F 13/4282* (2013.01); *H04L 12/40013* (2013.01); *H04L 2012/4028* (2013.01)

(58) Field of Classification Search
None
See application file for complete search history.

(56) References Cited

U.S. PATENT DOCUMENTS 7,724,740 B1 * 5/2010 Wang ............... H04L 12/40013
370/392
9,582,447 B2 2/2017 Arehart et al.

OTHER PUBLICATIONS

Whelan ("Hardware based packet filtering using field programmable gate arrays", Apr. 15, 2010, pp. 1-5).*
Department of Defense US, MIL-STD-1553B, Military Standard: Aircraft Internal Time Division Command/Response Multiplex Data Bus (Sep. 21, 1978).

(Continued)

*Primary Examiner* — Idriss N Alrobaye
*Assistant Examiner* — Dayton Lewis-Taylor
(74) *Attorney, Agent, or Firm* — Adam Gene Pugh

(57) ABSTRACT

A device has a host port, a remote terminal (RT), an incoming line driver, an outgoing line driver, and at least one of an incoming message filter and an outgoing message filter. The host port communicatively couples to a shared host bus. The RT port communicatively couples to the RT. The incoming message filter receives an incoming host message from the host port and generates a filtered host message from the incoming host message employing at least one host message rule. The outgoing message filter receives an outgoing RT message from the RT port and generates a filtered RT message from the outgoing RT message employing at least one RT message rule. The incoming line driver communicates the filtered host message to the RT port. The outgoing line driver communicates the filtered RT message to the host port.

18 Claims, 14 Drawing Sheets

(56) References Cited

OTHER PUBLICATIONS

XILINX, Spartan-6 FPGA Data Sheet:DC and Switching Characteristics, DS162 (v3.1.1), Jan. 30, 2015.
Technical Committee SD Card Association, SD Specifications Part 1 Physical Layer Simplified Specification, Ver 4.10, Jan. 22, 2013.
Diligent, Cmod A7 Reference Manual, Rev. B, Jun. 24, 2016.

* cited by examiner

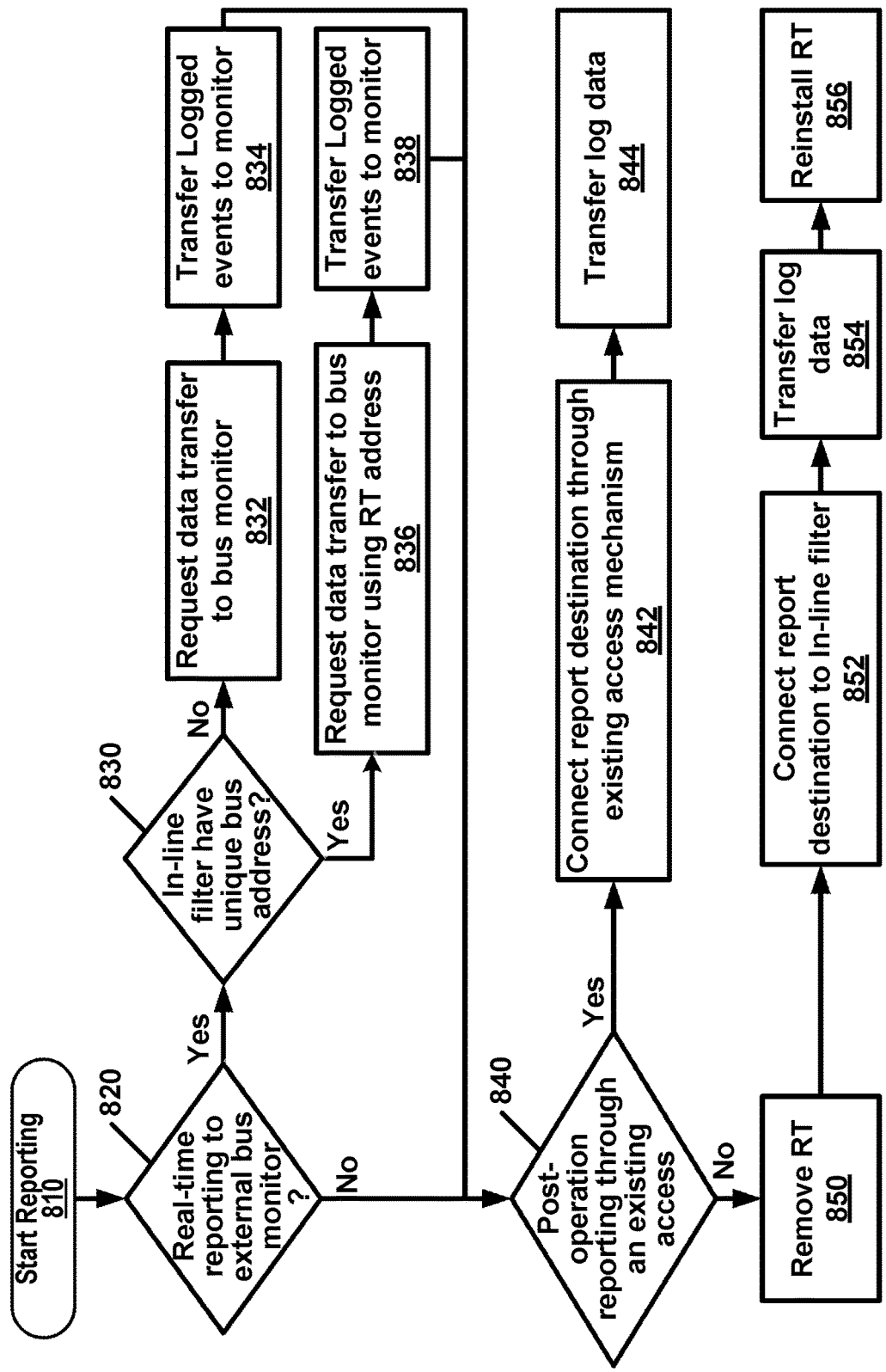

Direct Coupling

Transformer Coupling

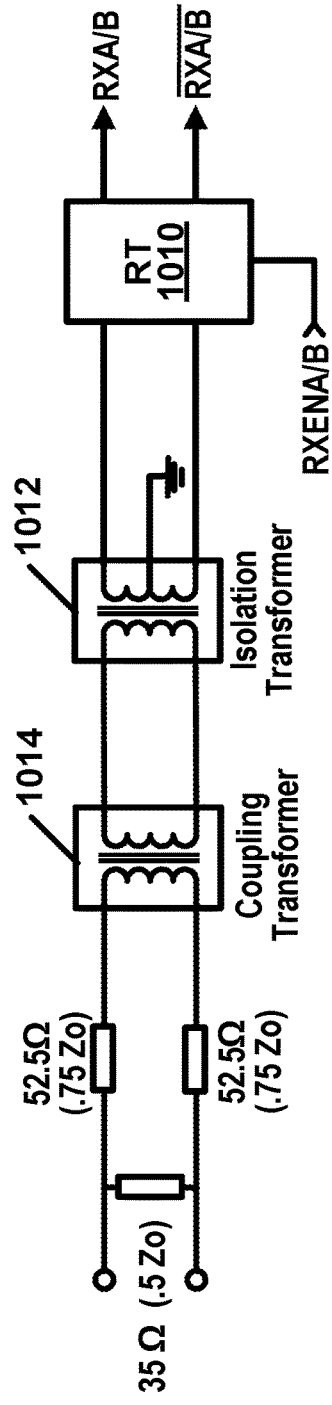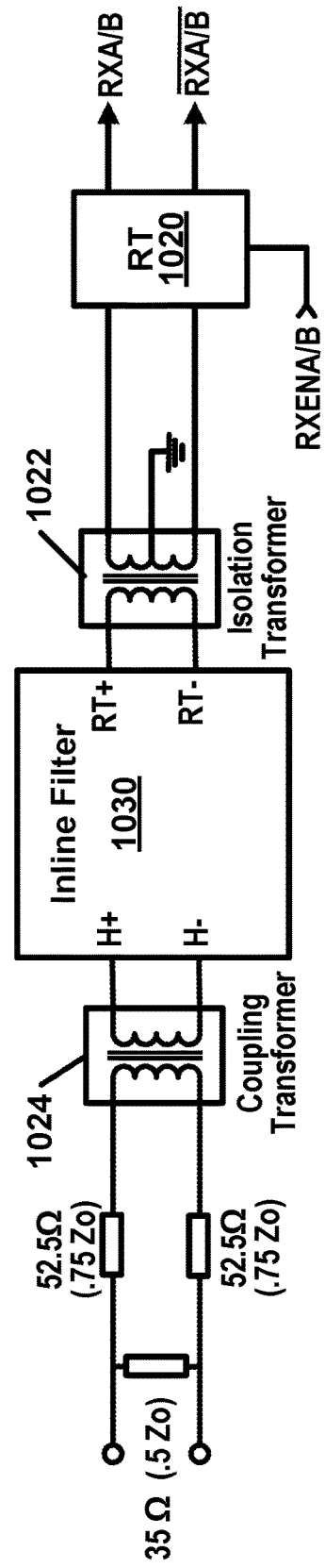

| Command | Inline Filter Action |
|---|---|
| Dynamic bus control | Default behavior |
| Synchronize (without data word) | Default behavior |
| Transmit status word | Default behavior |
| Initiate self test | Default behavior |
| Transmitter shutdown | Default behavior |
| Override transmitter shutdown | Default behavior |
| Inhibit terminal flag (T/F) bit | Default behavior, and verify that all subsequent statuses reflect inhibited mode until status changed by controller |
| Override inhibit T/F bit | Default behavior, and verify that all subsequent statuses reflect inhibited mode until status changed by controller |
| Reset remote terminal | Default behavior |
| Transmit vector word | Default behavior. If destination does not match controller-specified address, squelch further data words. If destination does not match a filtering policy, return an error status. See discussion for more use cases. |
| Synchronize (with data word) | Default behavior |
| Transmit last command word | Default behavior. Ensure that response is valid. |
| Transmit built-in-test (BIT) word | Default behavior |
| Selected transmitter shutdown | Default behavior |
| Override selected transmitter shutdown | Default behavior |

FIG. 13

| Transfer Mode | Inline Filter Action |
|---|---|
| Controller to RT Transfer. | Return error status if request is for a location (sub-address) or number of words prohibited by a filter policy. Optionally null out data words that should not have been written. |
| RT to Controller Transfer. | Drop response from the RT and return error status if request is for a location (sub-address) or number of words prohibited by a filter policy. |
| RT to RT Transfers (Transmitter side) | If recipient RT or its sub-address or transmitter RT sub-address is prohibited, return an error status and squelch any response from the RT. |
| RT to RT Transfers (Receiver side) | If transmitter RT or its sub-address or receiver RT sub-address is prohibited, do not pass data to the receiver RT and return an error status and once the data transmission is complete. |
| Mode Command Without Data Word. | Default behavior |
| Mode Command With Data Word (Transmit). | Default behavior |
| Mode Command With Data Word (Receive). | Default behavior |

FIG. 14

DATA TRANSFER FILTER

STATEMENT OF GOVERNMENT INTEREST

The invention described herein may be manufactured, used and licensed by or for the Government of the United States for all governmental purposes without the payment of any royalty.

FIELD OF THE INVENTION

The present disclosure relates generally to data bus communications and, more particularly, to regulation of communications between devices on a shared data bus and a remote terminal.

BACKGROUND OF THE INVENTION

Many Command/Response busses employ a bus controller to initiate communications between a controller and remote terminals connected to the bus, and between the remote terminals themselves. Examples of a command/response bus include the MIL-STD-1553 (and variants) and MIL-STD-1773 busses. These example command/response bus types may be employed for digital, command/response, and time division multiplexing designed for avionics data busses. The MIL-STD-1553 bus uses electrical signaling and the MIL-STD-1773 bus uses optical signaling. Nearly all mission essential subsystems on a military aircraft communicate with one another over one of these two types of busses. Each of these subsystems may come from different sources (manufacturers)—some more trustworthy than others—and each of the components that make up each subsystem may also come from individual sources that may or may not be trustworthy. Subsystems on shared data busses may "see and hear" everything that goes on between every other subsystem and the bus. Subsystems connect to the MIL-STD-1553 bus through a standard two-conductor connector (analogously, to a MIL-STD-1773 bus through a fiber optic coupler) that may allow them to listen in on communications of unrelated subsystems and may allow them to jam the bus either intentionally or unintentionally. Subsystems may be faulty when installed, develop faults after installation, or may be maliciously engineered to allow for remote access and control through, for example, Radio Frequency (RF) channels. It is also possible for one subsystem to reset another by acting temporarily as a bus master. MIL-STD-1553 and MIL-STD-1773 busses are deployed on a multitude of systems such as, for example, aircraft systems, missile systems, ground vehicles systems, supervisory and data acquisition (SCADA) systems, and space systems.

The bus may be considered the nervous system of the vehicle with few, if any, safeguards because it is possible that subsystems may listen in on communications of unrelated subsystems and may also jam the bus either intentionally or unintentionally. It is also possible for one subsystem to reset another by acting temporarily as a bus master. Therefore, there is a need to protect communications over Command/Response busses to mitigate these risks.

With regard to relevant prior art, U.S. Pat. No. 9,582,447, Arehart et al., teach prior art on protecting MIL-STD-1553, but it achieves similar goals through dissimilar means. Arehart et al. teach means to modify the topology of the bus network to protect end-point remote terminals in the system. Specifically, they teach the introduction of a switch that replaces the shared common data bus with a series of point-to-point connections or they introduce a similar capability into the bus controller to create a Bus Controller Processor and Memory (BCPM) that similarly replaces the shared common bus. Further, Arehart et al describe bus monitoring, which in general is already common in MIL-STD-1553 implementations, Arehart, et al. require an additional port for communications from the monitor to the BCPM. Still further, while Arehart, et al. describe how monitors may communicate to the BCPM over a dedicated communication path, they do not teach a means to extract logged data via other means. Finally, Arehart, et al. do not teach a means of initializing the system when the addresses and other metadata of the guarded remote terminal or subsystem is unknown.

BRIEF SUMMARY OF THE INVENTION

In contrast to the prior art method provided principally by U.S. Pat. No. 9,582,447 to Arehart et al, the present invention described herein does not replace the shared common bus, does not require an additional monitoring port, nor does it modify the bus controller. In contrast, the present invention described herein describes both an apparatus and methods to use the single, existing, connection to the shared common bus. Furthermore, while both Arehart et al and the present invention describe remedial actions to be conducted in response to events, the present invention described herein teaches a broader class of remediation to include transforming the content of messages and incorporating contextual information into identifying and remediating undesirable interactions. Still and in contrast to Arehart et al, the present invention described herein teaches a means to observe this information at initialization and to use that information to configure the filter's rule sets.

The foregoing problems and other shortcomings, drawbacks, and challenges associated with protecting communications over Command/Response busses are overcome by the embodiments described herein. While the invention will be described in connection with certain embodiments, it is understood that it is not limited to these embodiments. To the contrary, the present invention includes all alternatives, modifications and equivalents within the scope of the embodiments disclosed.

Therefore, in accordance with an embodiment of the present disclosure, a device is provided. The device may include a host port, a remote terminal (RT) port, at least one of an outgoing message filter and an incoming message filter, an incoming line driver, and an outgoing line driver. The host port is configured to communicatively couple to a shared host bus. The RT port is configured to communicatively couple to an RT. The incoming message filter is configured to: receive an incoming host message from the host port and generate a filtered host message from the incoming host message employing at least one host message rule. The outgoing message filter is configured to: receive an outgoing RT message from the RT port and generate a filtered RT message from the outgoing RT message employing at least one RT message rule. The incoming line driver is configured to communicate the filtered host message to the RT port. The outgoing line driver is configured to communicate the filtered RT message to the host port. The host bus, which may be a shared bus, is connected to at least one bus controllers, a plurality of devices described herein, and potentially other remote terminals not guarded by the device described therein.

According to another embodiment, a method is provided. The method includes, when an incoming host message is received from a data bus: generating a filtered host message from the incoming host message employing at least one host message rule and communicating the filtered host message to an RT. When an RT message is received from the RT: generating a filtered RT message from an outgoing RT message employing at least one RT message rule and communicating the filtered RT message to the data bus.

In still another embodiment, a system is provided. The system includes at least one bus controller, at least one RT, at least one data transfer filter, an incoming line driver, and at least one outgoing line driver. The at least one bus controller is communicatively coupled to a host bus. The at least one data transfer filter includes: a host port, an RT port, at least one of an incoming message filter and an outgoing message filter, an incoming line driver, and an outgoing line driver. The host port is configured to communicatively couple to the host bus. The RT port is configured to communicatively couple to the RT. The incoming message filter is configured to: receive an incoming host message from the host port and generate a filtered host message from the incoming host message employing at least one host message rule. The outgoing message filter is configured to: receive an outgoing RT message from the RT port and generate a filtered RT message from the outgoing RT message employing at least one RT message rule. The incoming line driver is configured to communicate the filtered host message to the RT port. The outgoing line driver is configured to communicate the filtered RT message to the host port.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings provide visual representations which will be used to more fully describe various representative embodiments. They can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

FIG. 8 is a flow diagram illustrating example reporting of an embodiment of an in-line filter as per an aspect of an embodiment.

FIG. 10A is an example schematic illustrating a MIL-STD-1553 RT configured to connect to a bus through isolation transformer and a coupling transformer.

FIG. 10B is an example schematic illustrating a MIL-STD-1553 RT configured to connect to a bus through an isolation transformer, an inline filter embodiment, and a coupling transformer.

FIG. 13 is a table describing example bus controller commands and default actions that an in-line filter may implement according to an aspect of an embodiment.

FIG. 14 is a table describing example additional default behaviors for a system.

DETAILED DESCRIPTION OF THE INVENTION

Figure 1:
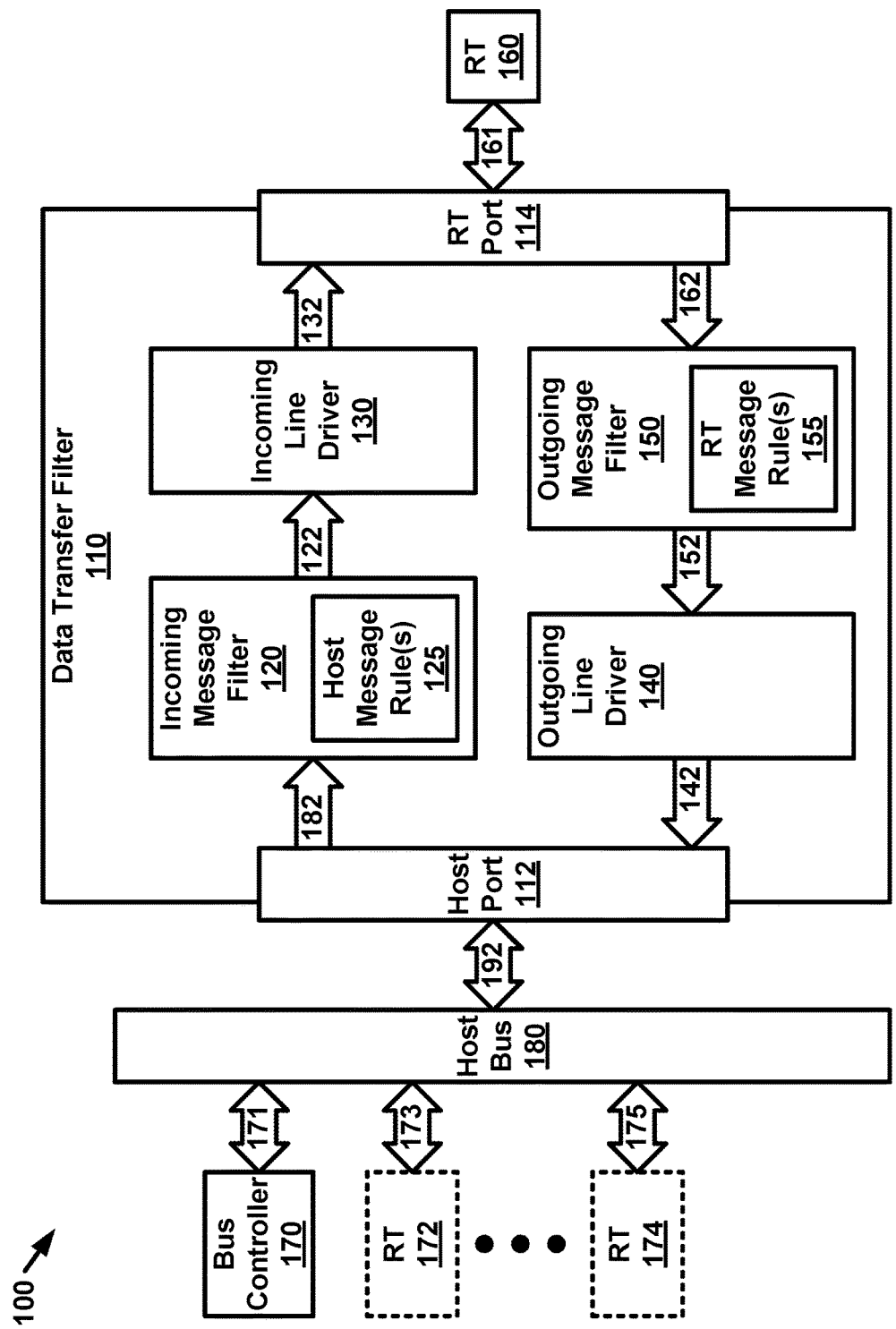
FIG. 1 is a block diagram of an example system employing an embodiment of a shared data bus filtering device.

The various methods, systems, apparatus, and devices described herein generally provide for improved data bus communications on a shared data bus. Embodiments of the present invention are directed to a data transfer filter configured to isolate a remote terminal (RT) from bus controller(s) and additional RT(s) residing on a shared host data bus. The data transfer filter may enforce a series of rules regulating communications between the RT and the bus controller(s) and additional RT(s). The data transfer filter has: a host port, a RT port, an incoming line driver, an outgoing line driver, and at least one of an incoming message filter and an outgoing message filter. The host port communicatively couples to a host bus. The RT port communicatively couples to the RT. The incoming message filter receives an incoming host message from the host port and generates a filtered host message from the incoming host message employing at least one host message rule. The outgoing message filter receives an outgoing RT message from the RT port and generates a filtered RT message from the outgoing RT message employing at least one RT message rule. The incoming line driver communicates the filtered host message to the RT port. The outgoing line driver communicates the filtered RT message to the host port. Additionally, the data transfer filter may log and/or report events for forensic analysis.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

Referring now to the drawings, FIG. 1 is a block diagram of an example system 100 where communications from bus controller 170 to RT 160 are regulated by data transfer filter 110. A bus controller (e.g., 170) may, for example, command various RTs (e.g., 160, 172 . . . 174) on a shared data bus (e.g., 180 and/or 161) to send or receive messages. A bus controller (e.g., 170) may operate according to a command list stored in its local memory and service requests received from RTs (e.g., 160, 172 . . . 174). According to an embodiment, all proper transactions on the host bus (180) may be initiated by a bus controller (170). A proper transaction is a transaction that follows a defined protocol between devices such as, for example, protocols defined by MIL-STD-1553. An RT (e.g., 160, 172 . . . 174) may include a sensor, actuator, subsystem, a combination thereof and/or the like configured to directly connect to a data bus (e.g., 180 and/or 161). The RT (e.g., 160, 172 . . . 174) may transfer data in and out as controlled by a bus controller (e.g., 170).

Data transfer filter 110 may include: a host port 112, an RT port 114, an incoming line driver 130, an outgoing line driver 140, and at least one of an incoming message filter 120 and an outgoing message filter 150.

The host port 112 may communicatively couple to, for example, host bus 180 via link 192. According to an embodiment, host port 112 may drive host bus 180 employing, for example, outgoing line driver 140 The host bus 180 may be configured to couple with at least one bus controller (e.g., 170) and at least one additional RT (e.g., 160, 172 . . . 174). According to an embodiment, additional devices may also be connected via shared host bus 180. The additional devices may include one or more additional bus controllers (not shown) and/or one or more additional RTs (shown as optional RTs 172 . . . 174). As illustrated, host bus 180 is a shared data bus. A shared data bus is a communications data bus configured to allow multiple devices to communicate with each other. However, alternative embodiments may include a host bus 180 that is not shared. In other words, the host bus 180 may be configured to couple with a single device that is not sharing the host bus 180 with additional devices. The single device may be a bus controller (e.g., 170) and a RT configurable as a backup bus controller, and/or the like.

The RT port 114 may communicatively couple to, for example, RT 160 via communications link 161. According to an embodiment, RT port 114 may be configured to communicate with only one RT (e.g., RT 160) even if additional devices become connected to the RT port 114. According to an embodiment, RT port 114 may drive communications link 161 employing, for example, incoming line driver 130.

The RT port 114 and/or host port 112 may be configured to interface with a data bus such as, for example, a MIL-STD-1553 data bus, a MIL-STD-1773 data bus, and/or the like. A MIL-STD-1553 data bus is multiplex serial data bus that conforms to the MIL-STD-1553 military standard published by the United States Department of Defense. MIL-STD-1553 defines the mechanical, electrical, and functional characteristics of a serial data bus. MIL-STD-1553 may be employed, for example, as an avionics data bus, a spacecraft data bus, an industrial data bus, and/or the like. MIL-STD-1553 employs multiple (commonly dual) redundant balanced line physical layers, a differential network interface, time division multiplexing, half-duplex command/response protocol, and may handle multiple RT devices. A version of MIL-STD-1553 using optical cabling in place of electrical cabling is known as MIL-STD-1773. It is envisioned that other data busses, such as MIL-STD-1773, RS-232, RS-422, and/or the like may also be employed.

The RT port 114 and/or host port 112 may employ differential signaling. Similarly, the host bus 180 may employ differential signaling. Differential signaling provides for electrically transmitting information using two complementary signals. The technique sends the same electrical signal as a differential pair of signals, each in its own conductor. The pair of conductors may include wires (typically twisted together) or traces on a circuit board. The receiving circuit may respond to the electrical difference between the two signals, rather than the difference between a single wire and ground. Differential signaling may be employed to minimize data corruption between the data transfer filter 110 and external devices (e.g., RT 160 and bus controller 170) due to electrical interference. An opposite technique, employable by an alternative embodiment, is called single-ended signaling and the embodiments described herein are also compatible with single-ended signaling.

The incoming message filter 120 may receive an incoming host message 182 from host port 112. Incoming message filter 120 may generate a filtered host message 122 from the incoming host message 182 employing at least one host message rule 125. The incoming line driver 130 may communicate a conditioned and amplified version of the filtered host message 132 to the RT port 114. The filtered host message (122 and 132) may include at least one of: an unmodified incoming host message; a squelched incoming host message; at least one nulled out non-header data word; and a null message. At least one of the host message rules 125 may have at least one allowed source identifier, at least one disallowed source identifier, at least one allowed destination identifier, at least one disallowed destination identifier, at least one disallowed header datum, a combination thereof, and/or the like.

The outgoing message filter 150 may receive an outgoing RT message 162 from RT port 114. Outgoing message filter 150 may generate a filtered RT message 152 from the outgoing RT message 162 employing at least one RT message rule 155. The outgoing line driver 140 may communicate a conditioned and amplified version of the filtered RT message 142 to the host port 112. The filtered RT message (152 and 142), discussed in more detail later, may have at least one of: an unmodified outgoing RT message; a squelched outgoing RT message; at least one nulled out non-header data word; and a null message. According to an embodiment, the outgoing RT message 162 may be squelched when not in response to the incoming host message 182 from a bus controller 170. At least one of the RT message rules 155 may have at least one allowed source identifier, at least one disallowed source identifier, at least one allowed destination identifier, at least one disallowed destination identifier, at least one disallowed header datum, a combination thereof, and/or the like. The outgoing filtering process is discussed in more detail below.

All or part of the data transfer filter 110 may employ various electronic circuits, including the incoming message filter 120, the incoming line driver 130, the outgoing message filter 150, and the outgoing line driver 140. Each of these circuits may be configured to perform individual functions and couple to other circuits. Some of these circuits may be integrated to perform combined functions. For example, according to an embodiment, the incoming message filter and the outgoing message filter may be integrated in a single circuit configuration.

The circuits described in this disclosure may be implemented in hardware, a combination of hardware and software, firmware, a combination thereof, and/or the like. For example, circuits may be implemented using computer hardware in combination with software routine(s) written in a computer language (such as C, C++, Fortran, Java™, Basic, Matlab™ or the like) or a modeling/simulation program such as Simulink™, Stateflow™ GNU Octave™, or LabVIEW MathScript™. Additionally, circuits may be implemented using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above-mentioned technologies may be used in combination to achieve the result of a functional circuit.

Various embodiments of the data transfer filter 110 may be programmable and/or configurable. For example, at least one of the incoming message filter 120, the outgoing message filter 150, the incoming line driver 130 and the outgoing line driver 140 may be configurable. Additionally, the host message rules 125 and RT message rules 155 may be programmable. Programming and/or configuring may be performed via one or more of, for example, the host port 112, the RT port 114, an additional port, a program control input, a combination thereof, and/or the like. The program control input may connect to one or more of the circuits to enable a programming mode. A programming mode may allow programming commands to be communicated via the host port 112, the RT port 114, a specialized port, combinations thereof, and/or the like. The programming commands may be configured to cause the circuits to change their internal programming and/or internal connection configuration. The program control input may be accessed, for example, directly through an independent connection on the data transfer filter 110. Alternatively, the program control input may be accessed, for example, via a connector of the data transfer filter 110. The connector may be a shared connector with other interconnections to and from the data transfer filter 110, such as power, communications, and/or the like.

The RT port 114 and/or the host port 112 may employ a communications capable connector. The communications capable connector may be mounted to a dedicated data transfer enclosure, an external enclosure, a bulkhead, combinations thereof, and/or the like. The communications capable connector may include Twinax connectors, Triax connectors, multi-pin connectors, a harness having multiple connectors, combinations thereof, and/or the like.

The data transfer filter 110 may further include a power circuit (not pictured). The power circuit may be configured to power at least one of the incoming message filter, the incoming line driver, the outgoing message filter, and the outgoing line driver. The power circuit may convert power available in an infrastructure (e.g., an aircraft) to a compatible level for circuits within the data transfer filter 110. Power circuits may have, for example, DC to DC power converters, single phase or three phase AC to DC power converters, combinations thereof, and/or the like.

The incoming message filter 120 and/or outgoing message filter 150 may be configured to log events. Logging events may include recording data related to events in a memory. Events may include, for example, messages filtered, messages received, messages forwarded, errors, power anomalies, power up times, combinations thereof, and/or the like.

The incoming message filter 120 and/or outgoing message filter 150 may be configured to report events. Reporting events may include communicating events to an external entity. The reporting may be via a sensory device such as a display, a speaker, combinations thereof, and/or the like. Reporting may be via communication links to, for example, an external analysis device, a computer, and/or the like. Reports may include raw and/or processed log files. Processed log files may include filtered data, statistical data, combinations thereof, and/or the like.

Figure 2:
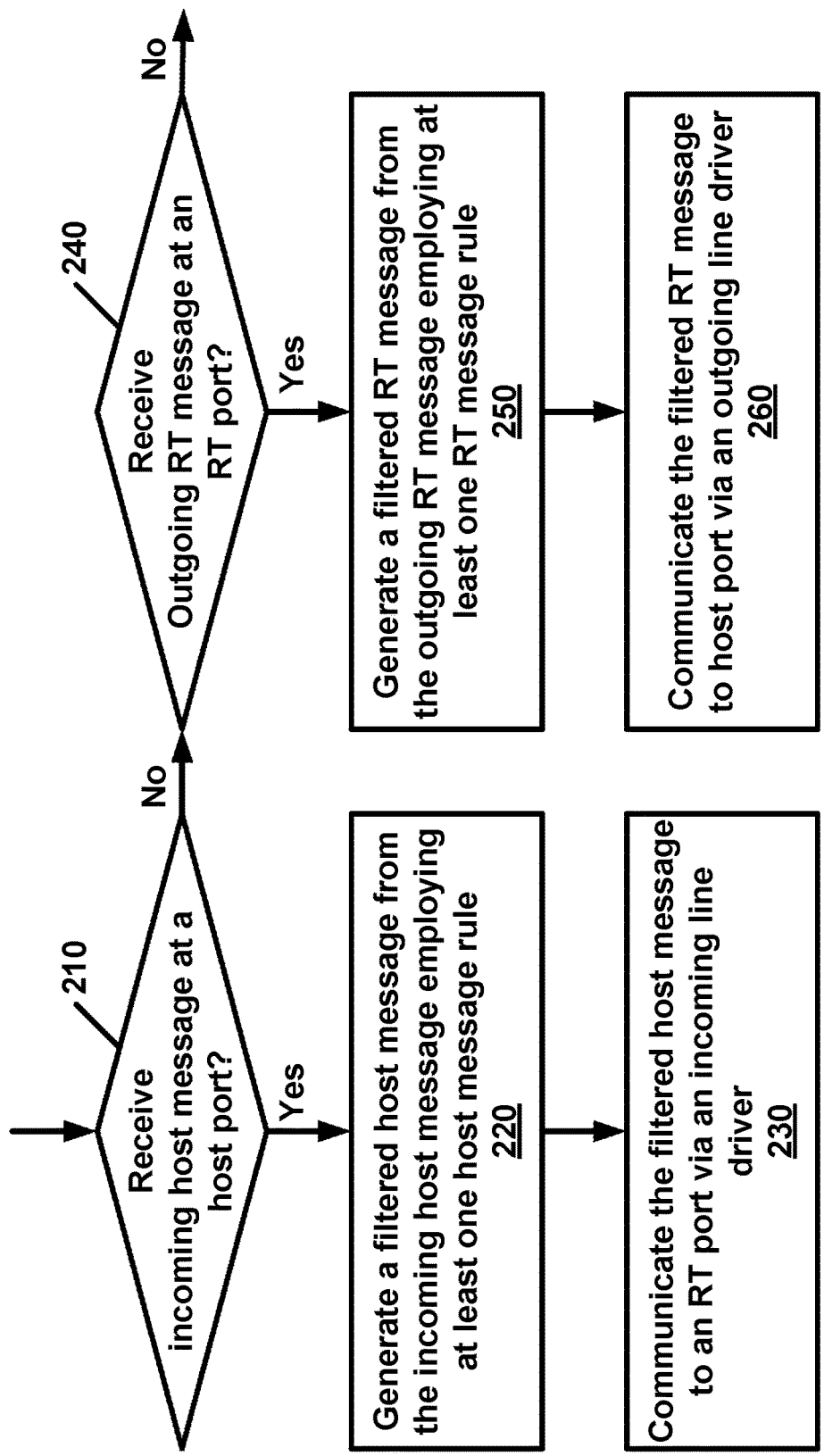
FIG. 2 is a flow diagram of an example embodiment as per an aspect of an embodiment.

FIG. 2 is a flow diagram of an example embodiment as per an aspect of an embodiment. The example embodiment illustrated in FIG. 2 may regulate communications between a bus controller (e.g., 170) communicatively coupled to a host port (e.g., 112) of a data transfer device (e.g., 110) and an RT device (e.g., 160) communicatively coupled to an RT port (e.g., 114) of the data transfer device (e.g., 110). It is envisioned that alternative hardware and system configurations may be employed.

At 210, a determination is made as to whether an incoming host message is received at a host port. If the determination is positive, a filtered host message may be generated from the incoming host message employing at least one host message rule at 220. Host message rule(s) may involve identifying at least one of: at least one allowed source identifier, at least one disallowed source identifier, at least one allowed destination identifier, at least one disallowed destination identifier, at least one disallowed header datum, a combination thereof, and/or the like. According to an embodiment, one or more factors may be considered when generating the filtered host message, including, but not limited to: header content of the incoming host message, source of the incoming host message, destination of the incoming host message, content of the data elements of the incoming host message, prior message communications, contextual data known to the incoming message filter, combinations thereof, and/or the like. According to an embodiment, one or more actions may be performed when generating the filtered host message, including, but not limited to: maintaining the incoming host message unmodified, squelching the incoming host message, nulling out non-header data words in the incoming host message, nulling out the incoming host message, retaining a header unaltered in the incoming host message, retaining incoming host message data unaltered, truncating subsequent data elements, setting data elements to predetermined values, and transforming data elements employing operational context, combinations thereof, and/or the like.

The filtered host message may be communicated to a RT at 230. The communication of the filtered host message may be initiated, for example, within a first determined period of time following receiving the incoming message. According to an embodiment, the data transfer device (e.g., 110) may be further configured to program the host message rules. The programming may be achieved via, for example, a host port, an RT port, a communications port, an additional port, a combination thereof, and/or the like. The filtered host message may include, for example, a non-null message.

At 240, a determination is made as to whether an RT message is received at a RT port. If the determination is positive, a filtered RT message may be generated from the outgoing RT message employing at least one RT message rule at 250. RT message rules may involve identifying at least one of: at least one allowed source identifier, at least one disallowed source identifier, at least one allowed destination identifier, at least one disallowed destination identifier, at least one disallowed header datum, a combination thereof, and/or the like. Several factors may be considered when generating the filtered RT message, including, but not limited to: content of the outgoing RT message header, the destination of the outgoing message, content of outgoing RT message data elements, prior message communications, and contextual data known to the message filter, combinations thereof, and/or the like. Several actions may be performed when generating the filtered RT message, including, but not limited to: maintaining the outgoing RT message unmodified, squelching the outgoing RT message, nulling out non-header data words in the outgoing RT message, nulling out the outgoing RT message, retaining a header unaltered in the outgoing RT message, retaining outgoing RT message data unaltered, truncating subsequent data elements, setting data elements to predetermined values, transforming data elements employing operational context, combinations thereof, and/or the like.

The filtered RT message may be communicated to the host port at 260. The communication of the filtered RT message may be initiated, for example, within a second determined period of time following receiving the outgoing RT message. According to an embodiment, the data transfer device (e.g., 110) may be further configured to program the RT message rules. The programming may be achieved via, for example, a host port, a RT port, an additional port, a communications port, a combination thereof, and/or the like. The filtered RT message may include, for example, a non-null message.

According to an embodiment, a data transfer device (e.g., 110) may further customize message rules with a learned RT address. Initialization messages may be observed on the data bus. The data transfer device may wait for the RT to respond to at least one of the initialization messages. An RT address may be extracted from at least one of the initialization messages and/or the RT response. At least one of the host message rules and/or the RT message rules may be modified with the RT address. Additionally, the device may further log and report events related to the operation of the data transfer device.

Embodiments have an in-line filter device configured to ensure that subsystems (e.g., a RT) are restricted to authorized interactions within a command/response bus. The figures and examples use the MIL-STD-1553 specification and typical embodiments to illustrate embodiments herein, but one skilled in the art will recognize that in-line filters may be employed to other media as well.

Embodiments of the in-line data filter may be interposed between a shared data bus and a subsystem that would ordinarily connect directly to the shared data bus. While many physical embodiments are possible, in an avionics context, two embodiments are building the in-line filter into a connector coupler or a bulkhead where the RT connects to a platform MIL-STD-1553 bus. In either case, there may be other signals and power in the connector or bulkhead. While there may be several placement options, the embodiment may be disposed between a host bus connector and a remote terminal connector. The data filter may perform a multitude of tasks, such as, for example: 1) squelching (for example, not forwarding) messages that should not be received by the remote terminal; 2) nulling out transfers (zero-out non-header data words) from other remote terminals that are not destined for the filtered remote terminal; 3) checking, nulling, and/or squelching outgoing responses from the remote terminal based upon factors such as conformance to protocol, destination, and content; and/or 4) squelching messages from the Remote Terminal that are not properly initiated by the bus controller. A basic function of an embodiment may be to control a remote terminal by means of assessing and potentially filtering bus message traffic that reaches the remote terminal and remote terminal traffic that reaches the bus. An embodiment may perform this function based upon a set of rules that define allowed and disallowed traffic.

Figure 3:
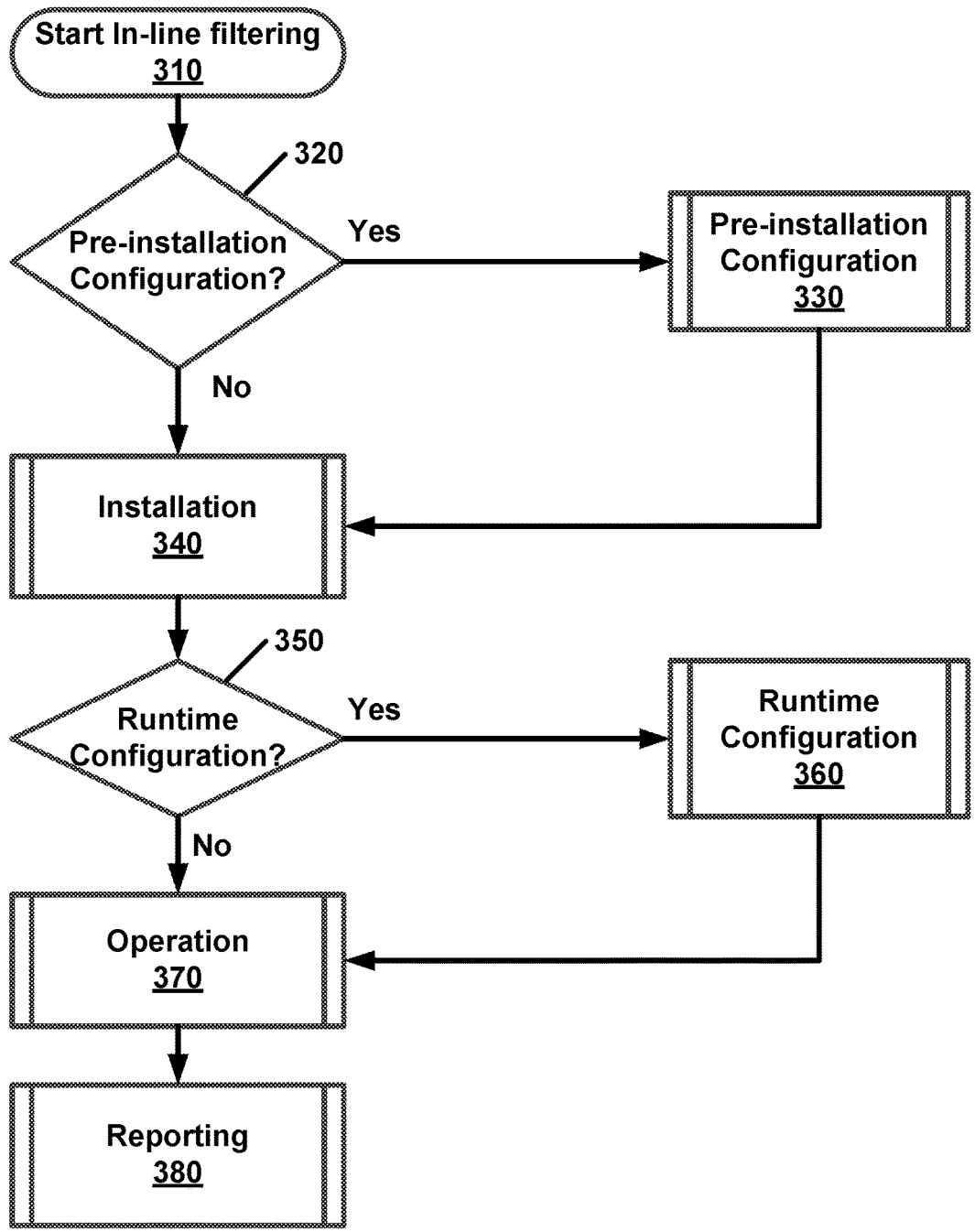
FIG. 3 is a block diagram of an example process for configuring, installing, and operating an embodiment.
Figure 4:
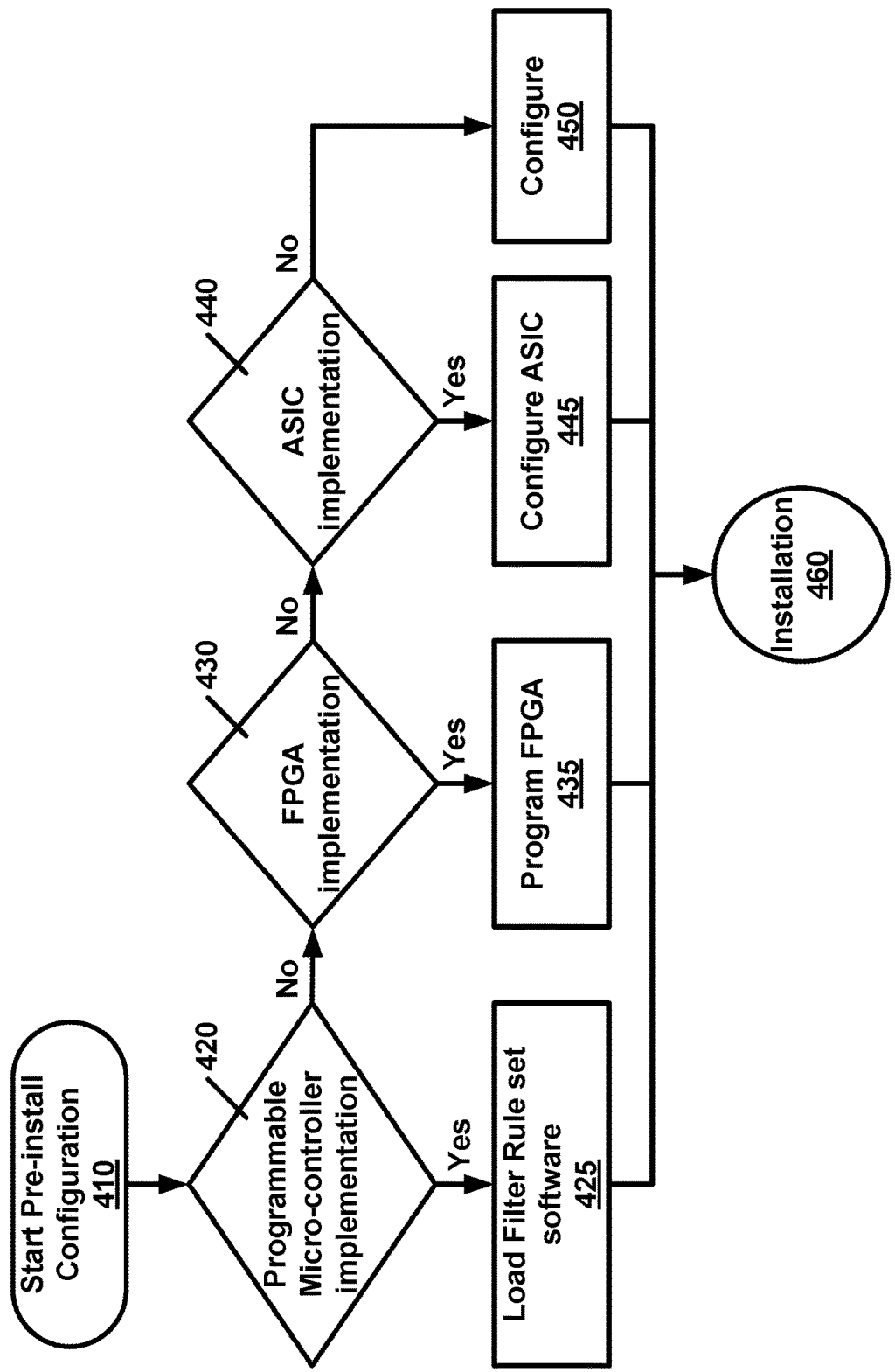
FIG. 4 is a flow diagram of an example process for pre-installing a configuration of an embodiment.

FIG. 3 is a flow diagram of an example process for configuring, installing, and operating an embodiment. This block diagram shows an example top-level process for installing, configuring, and operating an embodiment of an in-line filter. The in-line filter may start operation at 310. If it is determined at 320 that a pre-installation configuration is desired and/or necessary, a pre-installation configuration may be performed at 330. FIG. 4 is a flow diagram of a process for pre-installing a configuration of an embodiment. Embodiments may employ one or more various devices, such as for example, a programmable micro-controller, a Field Programmable Gate Array (FPGA), an Application-Specific Integrated Circuit (ASIC), combinations thereof, and/or the like. One or more rule sets may be programmed into these devices using various standard techniques depending upon the device. The devices may be configured and/or reconfigured employing software, firmware, hardcoded circuit logic, combinations thereof, and/or the like. If an embodiment employs a programmable micro-controller (determined at 420), a filter rule set software may be loaded at 425. If an embodiment employs a FPGA (determined at 430), the FPGA may be programmed at 435. If an embodiment employs an ASIC (determined at 440), the ASIC may be configured at 445. If an embodiment employs another technology (for example, discrete logic, Programmable Read Only Memory (PROM), combinations thereof, and/or the like), that other technology may be configured at 450. The embodiment may be installed at 460.

Figure 5:
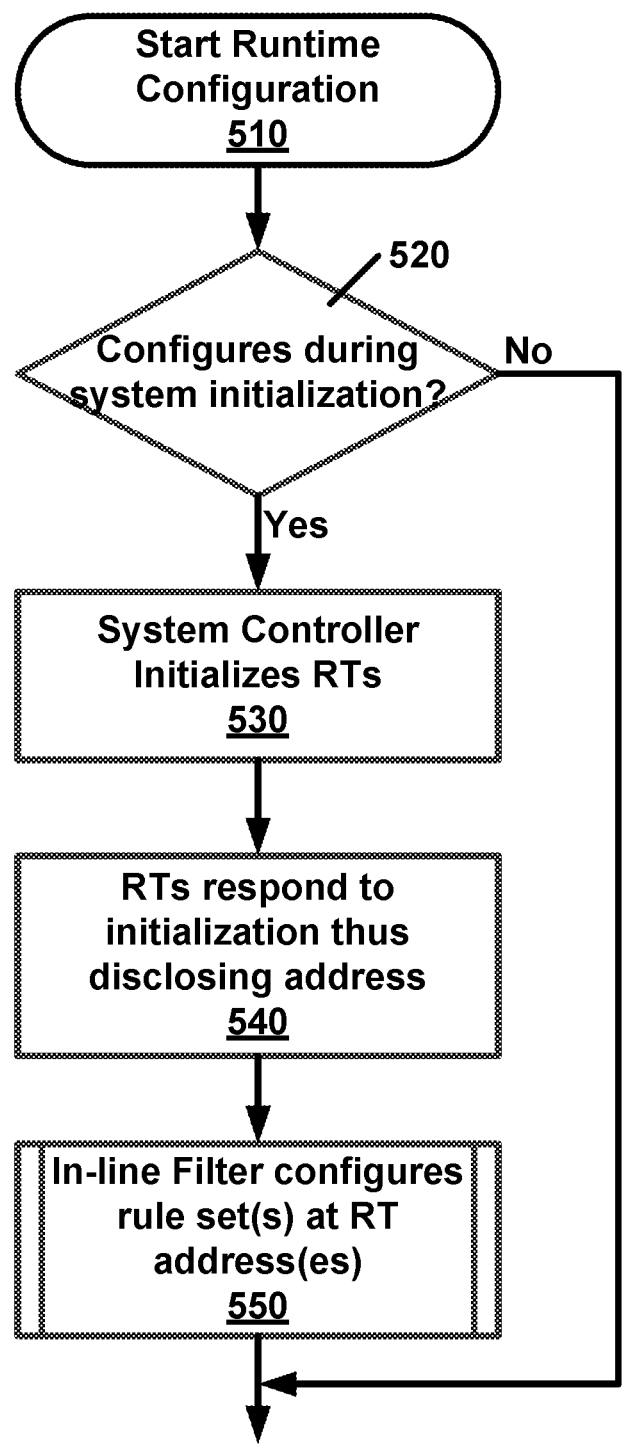
FIG. 5 is a flow diagram of an example process for installing a configuration of an embodiment at runtime.

An embodiment may be installed into a system between an RT and a shared data bus at 340. At 350, a determination may be made as to whether a runtime configuration is necessary and/or desired. If the determination is positive, the embodiment may be configured at runtime at 360. FIG. 5 is a flow diagram of an example process for installing a configuration of an embodiment at runtime. The runtime configuration may start at 510. A determination may be made as to whether a runtime configuration is necessary and/or desired at 520. If the determination is positive, a system controller may initialize RTs at 530. The RTs may disclose their addresses in response to the initialization at 540. An embodiment of an in-line filter may configure rule set(s) at various RT address(es) at 550.

Figure 6:
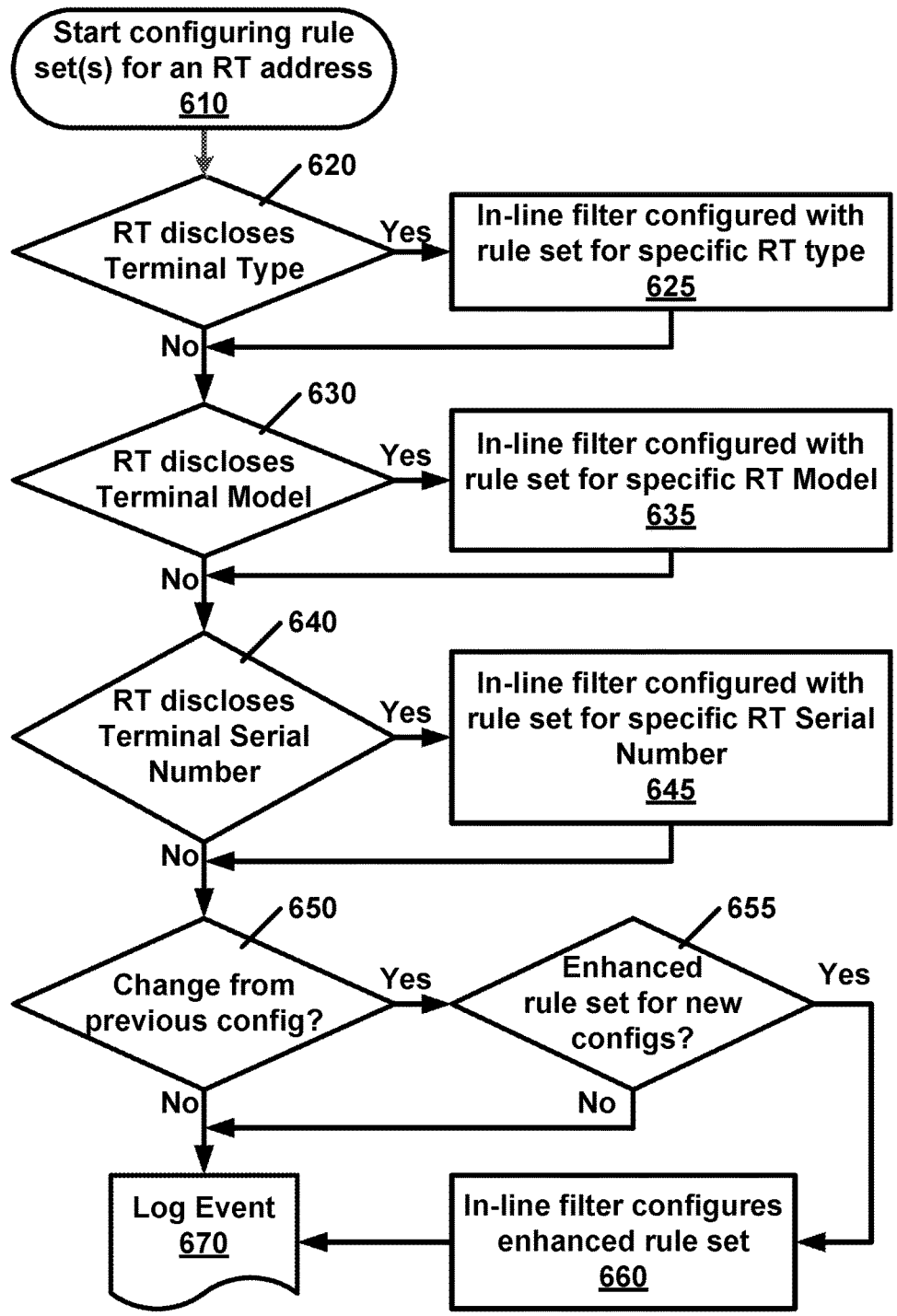
FIG. 6 is a flow diagram of an example process for configuring rule set(s) for an RT address according to an aspect of an embodiment at runtime.

FIG. 6 is a flow diagram of an example process for configuring rule set(s) for a RT address according to an aspect of an embodiment at runtime. The process to configure rule set(s) for a RT address may begin at 610. If a determination is made at 620 that a RT has disclosed a terminal type, an in-line filter may be configured with a rule set for a specific disclosed RT type at 625. If a determination is made at 630 that a RT has disclosed a terminal model, an in-line filter may be configured with a rule set for specific disclosed RT model at 635. If a determination is made at 640 that a RT has disclosed a terminal serial number, an in-line filter may be configured with a rule set specific for the disclosed RT serial number model at 645. An in-line filter may be configured with an enhanced rule set at 660 if a determination is made at 650 that there is a change from a previous configuration and a determination is made at 655 that there is an enhanced rule set available for configurations. A configuration event may be logged at 670.

At 370, the in-line filter may be placed into operational service as described in this disclosure. An in-line filter may also report on their activity at 380. Reporting may occur in real-time or post operation. Reporting may include downloading logged data.

Additionally, in-line filters may be reconfigured beyond their initial configuration. Reconfiguration may take place before installation (see example FIG. 4) and at run time (see example FIG. 5). If the intended context of an in-line filter is understood in advance, there may not be a need for runtime configuration. Minimally, the in-line filter may need to be configured with the address of the controlled RT, whether that information is programmed in advance or gleaned at run time.

In operation, an embodiment of the in-line filter may enforce rules on admissible data transfers and may log events of interest for reporting.

Figure 7:
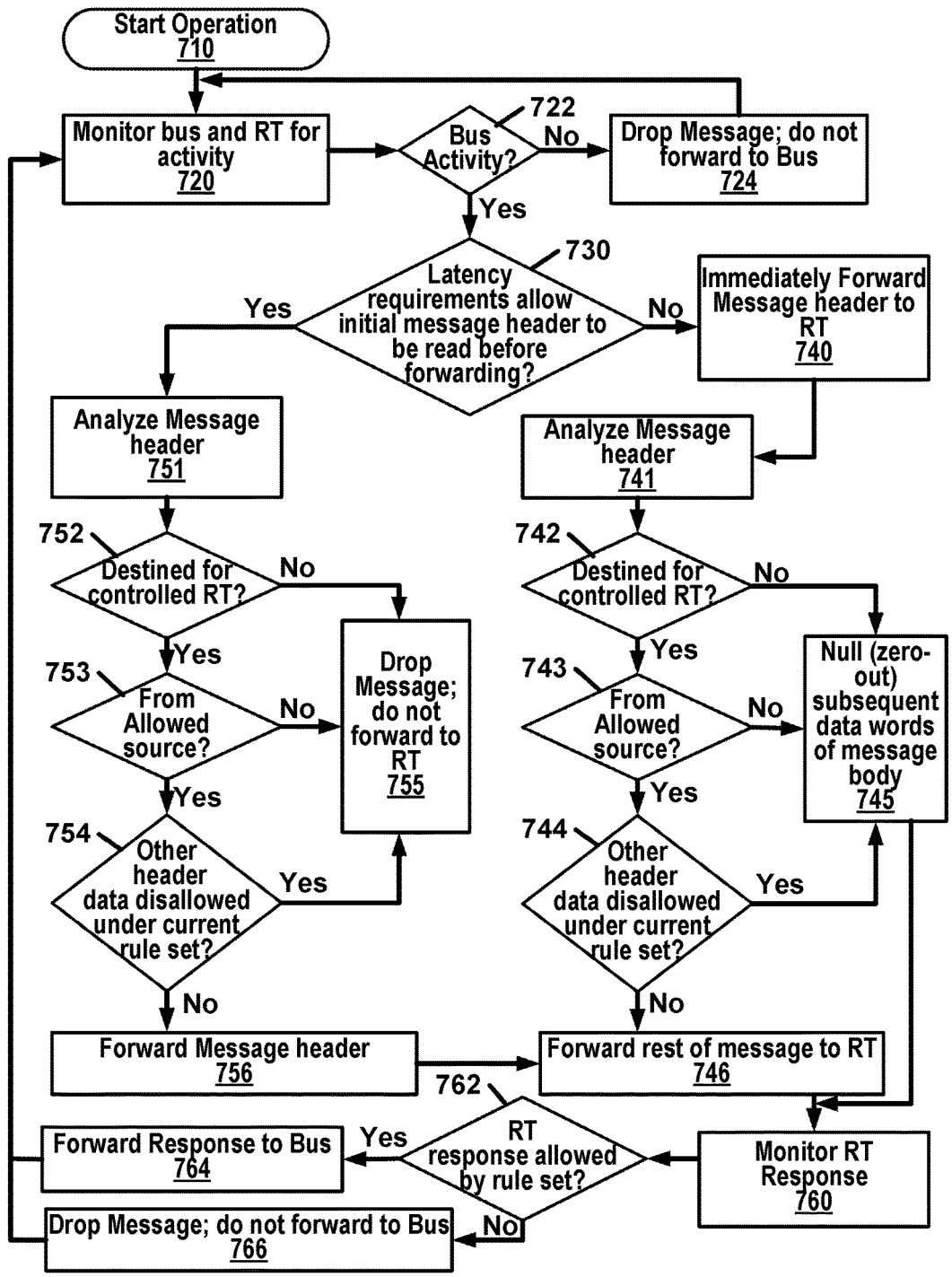
FIG. 7 is a flow diagram illustrating an example operation of an embodiment of a command/response in-line filter as per an aspect of an embodiment.

FIG. 7 is a flow diagram illustrating an example operation of an embodiment of a command/response in-line filter. An in-line filter may start operation at 710. The in-line filter may simultaneously monitor both its host bus interface and its RT interface at 720. Since interactions in a strict command/response bus may be initiated by the bus controller, a message originating at the RT that is not in response to a message to that RT may be determined at 722 to be a protocol breach and may be squelched at 724. For example, a malicious RT might attempt to impersonate a bus controller in this manner.

Transactions may be initiated by the bus controller and an in-line filter may respond to a message based upon its header. If the entire header can be processed before forwarding, the in-line filter may completely suppress (squelch) a message that the RT should not see at 724, but in some situations, such as on the MIL-STD-1553 bus, to delay the forwarding of the header may not allow the RT to respond to a legitimate request within the latency requirements of the standard. This latency determination may be made at 730. In this case, the header may be passed through to the RT at 740 before being analyzed, but the in-line filter may also take actions (e.g., pass or null out) on the remaining words in the message and may determine in advance whether the RT will be able to respond through the in-line filter embodiment.

If it was determined at 730 that the latency requirement cannot be met, the message header may be forwarded to the RT at 740. The message header may be analyzed at 741. The rest of the message may be forwarded to the RT at 746 if: a positive determination is made at 742 that the message is destined for the controller RT, a positive determination is made at 743 that the message is from an allowed source, and a determination is made at 744 that other header information is not disallowed under a current rule set. Otherwise, the rest of the data words in the message body may be zeroed (or otherwise nulled) out at 745.

If it was determined at 730 that the latency requirement is met, the message header may be analyzed at 751. The message header may be forwarded to the RT at 756 and the rest of the message may be forwarded to the RT at 746 if: a positive determination is made at 752 that the message is destined for the controller RT, a positive determination is made at 753 that the message is from an allowed source, and a determination is made at 754 that other header information is not disallowed under a current rule set. Otherwise, the message may be dropped and/or otherwise not forwarded to the RT at 755.

The RT may be monitored for a response at 760. If the RT response is determined at 762 to be allowed by a rule set, the response may be forwarded to the bus at 764. Otherwise, the message may be dropped and/or otherwise not forwarded to the RT at 766. The in-line filter may then return to monitoring the bus and RT for activity at 720.

FIG. 8 is a flow diagram illustrating example reporting (810) of an in-line filter as per an aspect of an embodiment. Events that are logs may be reported out in any of several ways. If an in-line filter is allowed to communicate with a bus monitor (determined at 820), the in-line filter may report anomalous behavior during operation. In some situations, the in-line filter embodiment may be independently addressable over the bus (determined at 830), in which case the monitor may request permission to logged data over the bus at 832. The logged data may be transferred to the monitor at 834. The logged data may be in a mutually acceptable format for both the in-line filter and the monitor. If it was determined at 830 that the in-line filter embodiment is not addressable over the bus, other mechanisms may be employed to obtain access to the logs. For example, the in-line filter embodiment may impersonate the RT and use its address to request a data transfer to the monitor at 836. The in-line filter embodiment may initiate the transfer of logged events to the monitor at 838 while blocking traffic from the RT so that the RT is not aware it is being addressed by a bus controller. There may also be other out-of-band reporting capabilities that may interact with the in-line filter embodiment.

Log data may be reported outside of operations (e.g., post-mission for an aircraft or during maintenance). Post operation reporting may report through an existing access mechanism (determined at 840). Examples of an existing access mechanism include an accessible hardwired port, a wireless link, or the connector to the RT may be employed to connect at 842 the in-line filter embodiment to a device that reads its logs at 844. If the RT connector is employed, the RT may be disconnected from the connector at 850. A report destination device may be connected to the in-line filter embodiment at 852 and log data transferred at 854. The RT may be reinstalled at 856. It may be possible that the reports could be retrieved through the RT, but this may allow the RT access to information it is not supposed to know about. In a case like this, a malicious RT might be able to observe the reports and mask its behavior.

Connectors and protocols may be specific to the implementation of the command/response bus. MIL-STD-1553 is employed herein as an example to illustrate a physical embodiment of this invention. In-line filters may be configured to connect to the MIL-STD-1553 bus employing, for example, a twinax connector and/or a triaxial variant of MIL-STD-1553 connectors such as standard plug-style connectors that resemble standard coaxial connectors, but with two conductors instead of one. There may also be other mounting variants, including bulk mount.

A filter embodiment may be embedded within a coupler. Alternate embodiments may be employed for bulkhead mounts. Still other embodiments may feature additional ports for power and/or programming, and other functions.

Figures 9A, 9B:
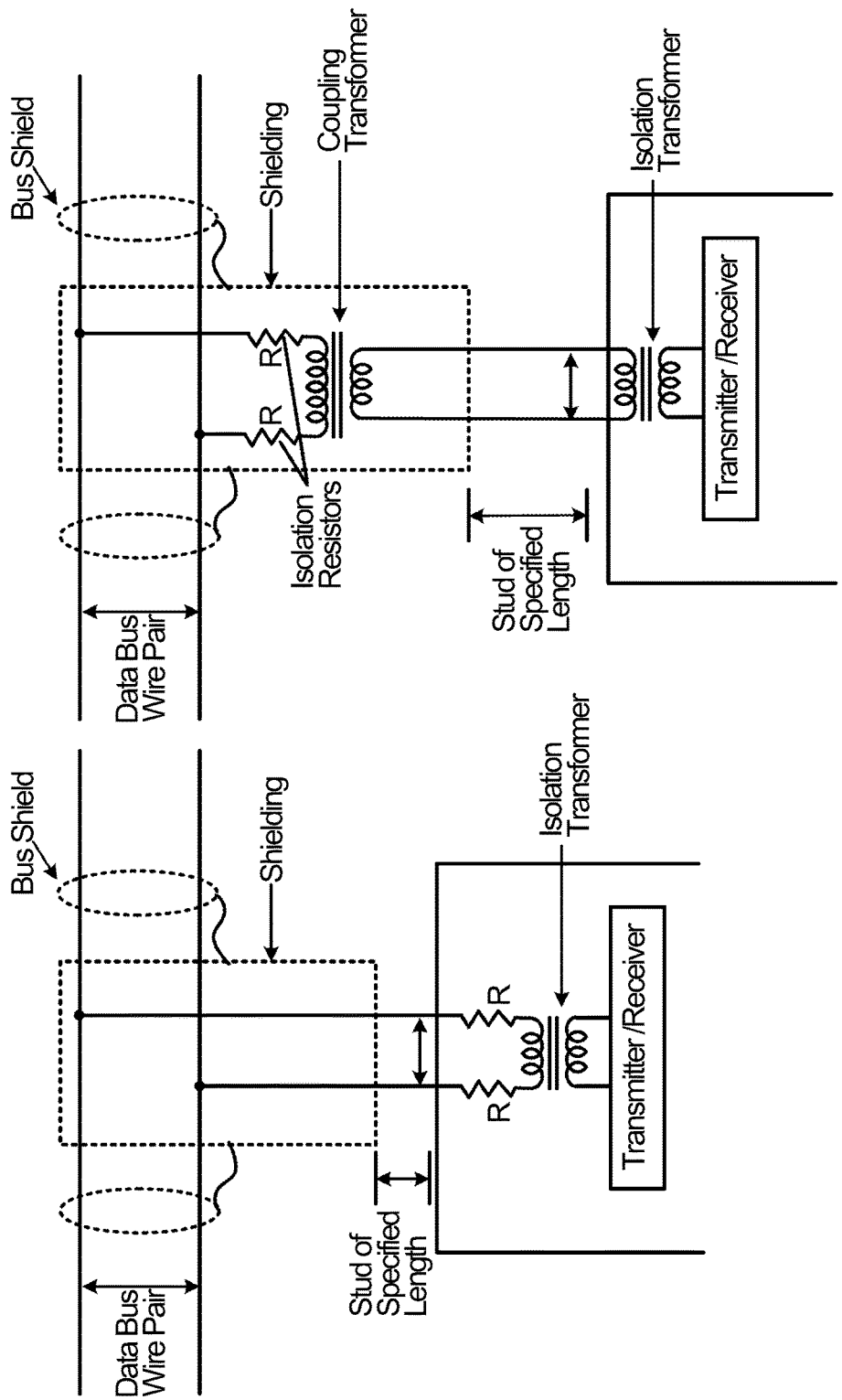
FIG. 9A is a schematic of prior art of a direct coupling that may be employed by an embodiment to connect to a data bus.
FIG. 9B is a schematic of prior art of a transformer coupling that may be employed by an embodiment to connect to a data bus.

FIG. 9A is a schematic of prior art of a direct coupling that may be employed by an in-line filter to connect to a data bus. FIG. 9B is a schematic of prior art of a transformer coupling that may be employed by an in-line filter to connect to a data bus. A RT may connect to the MIL-STD-1553 bus through one (see example FIG. 9A) or two (see example FIG. 9B) transformers. A typical isolation transformer may be available as, for example, an approximately 1 cm cube surface-mount device.

An embodiment filter may act as a relay between the coupling transformers and the isolation transformers of the bus. FIG. 10A is an example schematic illustrating a MIL- STD-1553 RT 1010 configured to connect to a bus through isolation transformer 1012 and a coupling transformer 1014. FIG. 10B is an example schematic illustrating a MIL-STD-1553 RT 1020 configured to connect to a bus through an isolation transformer 1022, an inline filter embodiment 1030, and a coupling transformer 1024. The in-line filter embodiment 1030 may provide MIL-STD-1553 compatible signaling (both in voltage and timing) bidirectionally to provide functionality without impairing the intended behavior of a system. Between each message may be an inter-message gap of approximately 4 µs to 12 µs. This is the amount of time within which a new bus driver may respond to a previous message. Typically, this is the delay between a message from a BC and the status response from a RT.

Because the inter-message gap may be less than a minimum message length, the entire message may not be stored, assessed, forwarded to the RT and processed prior to issuing a response. This may limit the class of filters that may be issued. Specifically, a command may be forwarded to the RT before knowing if that command is intended for that RT. However, if there are subsequent data words (for example, a RECEIVE command), the subsequent data words may be nulled out if intended for another RT because that message may not be relevant to this RT, and it may not be required to respond.

Figure 11:
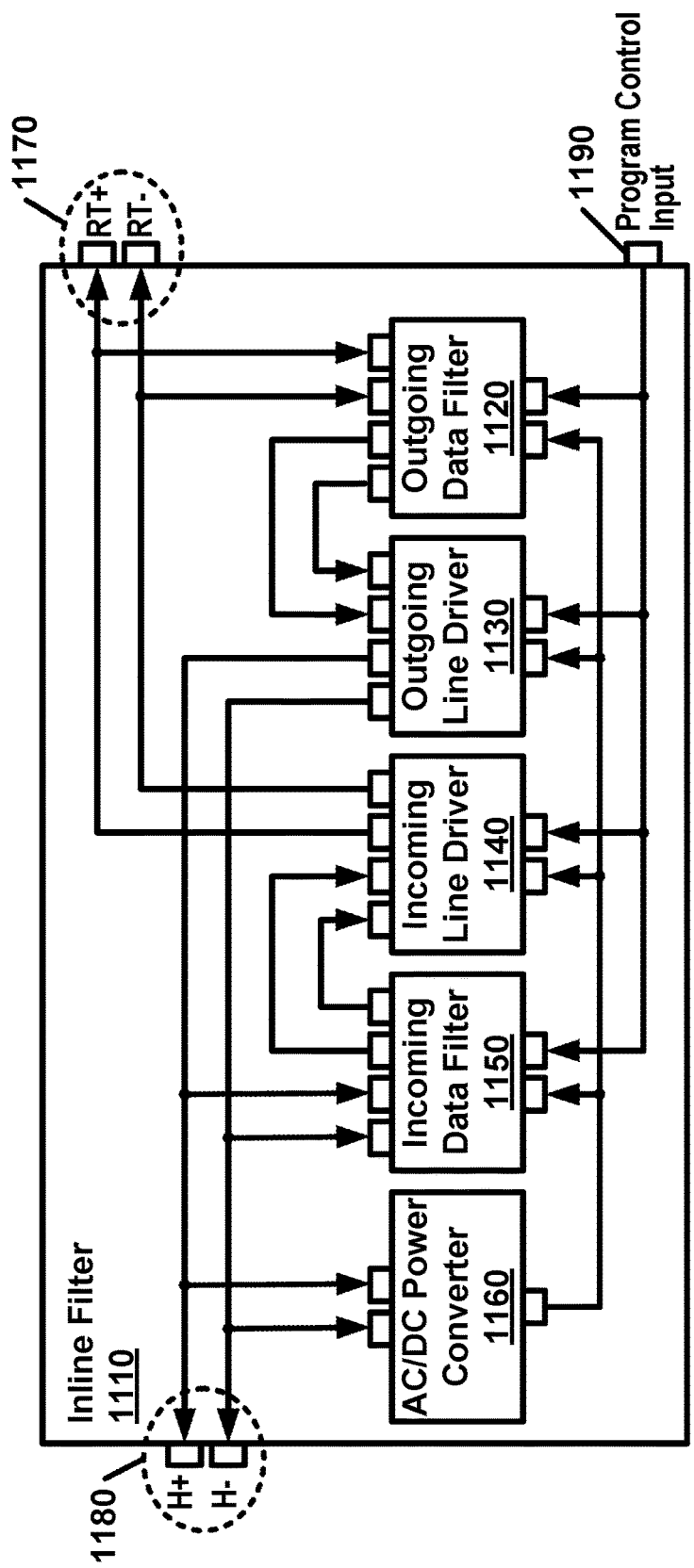
FIG. 11 is an example block diagram of an in-line filter 1110 according to an aspect of an embodiment.
Figure 12:
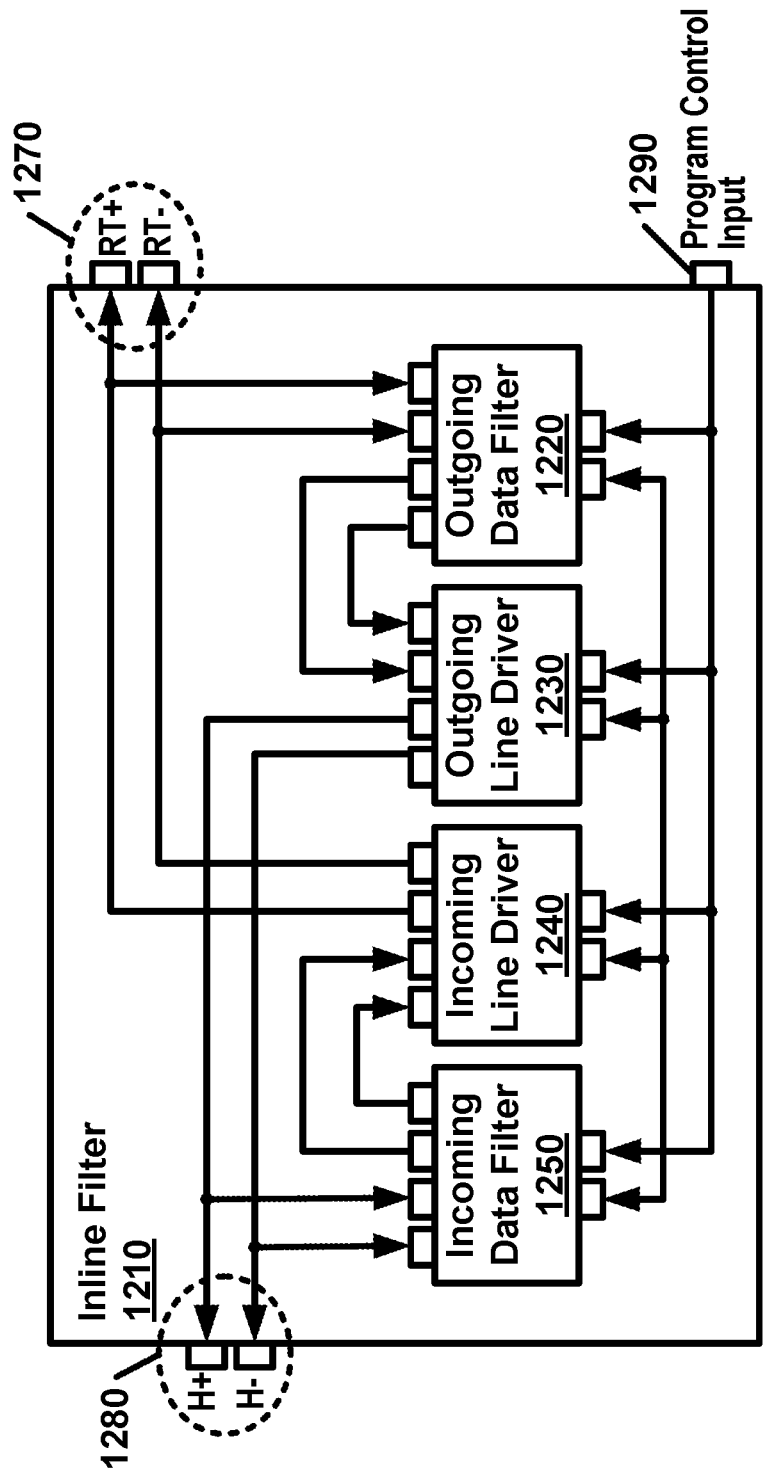
FIG. 12 is an example block diagram of an in-line filter 1210 according to an aspect of an embodiment.

FIG. 11 is an example block diagram of an in-line filter 1110 according to an aspect of an embodiment. As illustrated in this illustrative example, inline filter 1110 may have a host port 1180, a RT port 1170, a program control input 1190, an AC/DC power converter 1160, an incoming data filter 1150, an incoming line driver 1140, outgoing data filter 1120, and an outgoing line driver 1130. FIG. 12 is an example block diagram of an alternative in-line filter 1210 according to an aspect of an embodiment. As illustrated in this example, inline filter 1210 may have a host port 1280, a RT port 1270, a program control input 1290, an incoming data filter 1250, an incoming line driver 1240, outgoing data filter 1220, and an outgoing line driver 1230. This alternative embodiment may employ an external power source (not pictured). The external power source may be already present on an existing connector. The role of the incoming line drivers (1140 and/or 1240) and/or outgoing line drivers (1120 and/or 1220) may be to drive the respective segments within specified tolerances at the appropriate times. Specifically, the RT ports (1170 and/or 1270) may be driven when an external RT and/or controller is driving the host bus and the host bus port(s) (1180 and/or 1280) may be driven when the RT is expected to drive the host bus. In some embodiments, only the incoming traffic may be filtered. In this case, outgoing data filters (1120 and/or 1220) may not be needed.

Embodiments of the present disclosure include an in-line data filter that may be built into, for example, a connector coupler and/or a bulkhead where a RT connects to a platform. According to another embodiment, an in-line data filter may be built into a RT. According to yet another embodiment, an in-line data filter may be built into a data bus coupler.

It is envisioned that multiple alternatives may be employed within the scope of the claimed embodiments beyond the specific example disclosed. Embodiments may be directed to various boundary control device(s) that may control message traffic to and from connected devices and may be controlled independently from both the connected devices and the systems to which the embodiment is connected. In particular, embodiments may null and/or squelch message(s) for which a determination has been made that the message(s) should not be exposed to the connected device and to null and/or squelch message(s) from the connected device to other devices that the filter may have determined is inappropriate.

Embodiments may apply a state-full assessment of prior traffic and other contextual information to determine whether incoming or outgoing messages are appropriate. Consider, for example, an industrial control system configured to control a centrifuge. Devices within this industrial control system may be acquired by various third parties, but the interface interconnecting the various devices may be well understood. An embodiment of a filter as per the scope of the claims may monitor commands and status to and from the connected device (for example, a centrifuge) and assess whether the commands are within desired operational limitations. Because the in-line filter may be configured to be programmed from either the control system or the connected device, the in-line filter may provide an independent assurance that the system is executing properly. In applying embodiments to this broader class of systems, an invariant may include filtering actions that do not impede proper execution of desired operations. These impediments may take the form of intolerable latencies or degraded signal quality. Beyond centrifuges, other systems such as Heating, ventilation and air conditioning (HVAC) systems, industrial machinery systems, elevators, and Supervisory and Data Acquisition (SCADA) systems may all benefit from embodiments of the invention. Industries and systems that may employ embodiments include commercial aircraft, unmanned vehicle, ships, trains and railway control systems. Many systems are complex and comprise interacting subsystems. In these systems, guaranteeing proper operations in the face of failures and attacks may be challenging. Embodiments of the present disclosure provide endpoint protection that may work when system-level protections fail and from limiting the threats that the endpoints may present to the overall system.

The present invention describes embodiments of in-line filters that null and/or squelch messages determined to be irrelevant or inappropriate. Embodiments may not be so limited to only nulling and/or squelching messages, but may apply other mitigating actions that may be taken in response to inappropriate messages. Examples of other mitigating actions include sending error messages over the shared data bus, raising a signal on an independent discrete line, sounding an alarm, disabling a RT, blowing a fuse on a link for a physical disconnection, combinations thereof, and/or the like.

Data transfers may include three types of words: command, status, and data. Control and Status words may encode the intended destination for a message, but not necessarily the source. The destination of data words may be determined by a preceding command or status word. Transfers may be initiated by a bus controller, with zero, one, or two RTs participating in subsequent messages. For example, there are 15 defined modes in the MIL-STD-1553 specification that may be specified in a command (only the bus controller may issue a command).

As used in connection with MIL-STD-1553 embodiments, a message may consist of one or more 16-bit words (command, data, or status) where the words within the message are transmitted contiguously with at least a 4 µs gap between messages. In accordance with certain embodiments, communication on the data bus is initiated by the bus controller and starts with a message command word that provides a definition of the message format of the message to be transmitted. The command word contains information about which RT(s) is to respond or listen to the message. If the command word is a receive command word, the RT identified in the command word is to listen; if the command word is a transmit command word, the identified RT should transmit data to the BC. Accordingly, the MIL-STD-1553 standard, for example, has 16-bit receive command words and 16-bit transmit command words sent by the BC to a specific RT, or between the BC and a pair of RTs.

FIG. 13 is a table describing example bus controller commands and default actions that an inline filter may implement. The example bus controller commands may include MIL-STD-1553 bus controller commands. It is envisioned that other command sets may be employed. The default behavior includes the inline filter passing commands through to the RT regardless of intended destination. However, if the message is not intended for this RT, the inline filter may squelch any response from the RT.

There may be, for example, six modes of data transfer: Controller to RT, RT to Controller Transfer, RT to RT Transfers, Mode Command Without Data Word, Mode Command With Data Word (Transmit), and Mode Command With Data Word (Receive). These example modes are described for illustrative purposes only and are from the perspective of an example MIL-STD-1553 bus. According to a Controller to RT Transfer, a Bus Controller may send one 16-bit receive command word, immediately followed by 1 to 32-bit data words. The selected Remote Terminal then sends a single 16-bit Status word. According to an RT to Controller Transfer, a Bus Controller may send one transmit command word to a Remote Terminal. The Remote Terminal may send a single Status word, followed by 1 to 32-bit data words. According to RT to RT Transfers, a Bus Controller may send out a receive command word immediately followed by a transmit command word. The transmitting Remote Terminal may send a Status word followed by 1 to 32-bit data words. The receiving Terminal may send its Status word. According to a Mode Command Without Data Word, a Bus Controller may send one command word with a Sub-address of 0 or 31 signifying a Mode Code type command. The Remote Terminal may respond with a Status word. According to a Mode Command With Data Word (Transmit), a Bus Controller may send one command word with a Sub-address of 0 or 31 signifying a Mode Code type command. The Remote Terminal may respond with a Status word immediately followed by a single Data word. According to a Mode Command With Data Word (Receive), a Bus Controller may send a command word with a Sub-address of 0 or 31 signifying a Mode Code type command followed by a data word. The Remote Terminal may respond with a Status word. In accordance with the MIL-STD-1553 protocol, the sub-address may be an address data buffer.

As with command modes, minimally the in-line filter may pass commands through to the RT (regardless of intended destination), but it may also squelch any return status if the RT was not the destination of the original command. In addition, if the RT is not the specified recipient of the command, data words may be nulled out (e.g., set to zero), before being forwarded to the RT. FIG. 14 is a table describing additional default behaviors for a system. Specifically, the table in FIG. 14 references MIL-STD-1553 bus data transfer transactions. Embodiments may be configured with other policies more stringent or relaxed than these default behaviors based upon mission needs. The actions in FIG. 14 assume that the command was destined for the RT in question, and that commands for other RTs were handled as described above.

The foregoing discussion has indicated several conditions that may be considered error conditions—either of a specification (for example, a wrong RT responding to a command) or of a policy (for example, RTs of two subsystems communicating that should not be communicating) and described remedial actions of returning error statuses or nulling out data words. In addition to these steps, embodiments may log errors for subsequent reporting.

One possible limitation is that data transfers from and to a RT may not be masked if the data transfers appear to be allowable based upon the parties and sub-addresses in question because that would induce an unacceptable response latency. However, that does not prohibit post hoc analysis of the data transfer contents. If data transfer content does not adhere to in-line filter rules, this may also result in an error. The results of such monitoring may also be logged for subsequent reporting. These rules may be arbitrarily state-full and/or complex.

There are at least three ways a bus controller may query an in-line filter to report its status and any error and/or diagnostic information. Logged data may additionally be retrieved through physical access to the in-line filter.

According to an embodiment, an in-line filter may have its own address on a MIL-STD-1553 bus. Optionally, a sub-address may be employed to indicate different classes of errors. A multiplicity of in-line filters may share a common MIL-STD-1553 address and sub-addresses may indicate which specific in-line filter is being addressed. An in-line filter may use a sub-address of its RT that is not otherwise in use.

According to an embodiment, an in-line filter may be configured with a policy set on an infrequent basis, for example before a Line Replaceable Unit (LRU) that includes a RT is installed. In many cases, the functionality of an LRU in a given position is fixed and the rules for its interactions with other subsystems is known, regardless of upgrades to the LRU.

However, according to an embodiment, it is anticipated that a programming unit may connect to an in-line filter, either through its existing (twinax/triaxial) connector or through another port. A characteristic of the programming unit is that it may not be mimicked by an LRU due to a physical disparity or cryptographic security measure. Therefore, an embodiment may include a programming device connector that may activate a "program mode" through an additional pin (for example, program control pin 1190 and/or 1290), and/or other physical element that cannot be accessed by an LRU. It may be visibly apparent that an LRU lacks a programming ability (for example, the programming device has three pins in the connector while the LRU has two, and/or the LRU uses a triaxial connector and the programming device uses a quad-axial connector, or an additional port is used).

Alternatively, if more dynamic configuration is desired, a bus control may configure an in-line filter by sending commands/data using mechanisms similar to those described for retrieving data logs, potentially with cryptograph protections.

The term "configured" or the like may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) employing using a FPGA to filter data on a MIL-STD-1553 shared data bus. However, one skilled in the art will recognize that embodiments of the invention may employ devices other than FPGAs (for example, discrete logic, ASICs, fast processor devices, and/or combinations thereof) to analyze other types of data busses (such as shared data busses employing MIL-STD-1773 and/or RS-422 busses).

The invention claimed is:

1. A device comprising:
   a host port configured to communicatively couple to a host bus;
   a remote terminal (RT) port configured to communicatively couple to a RT;
   at least one of:
      an incoming message filter and an incoming line driver, wherein:
         the incoming message filter is configured to:
            receive an incoming host message at the host port; and
            generate a filtered host message from the incoming host message employing at least one host message rule; and
         the incoming line driver is configured to communicate the filtered host message to the RT port; and
      an outgoing message filter and an outgoing line driver, wherein:
         the outgoing message filter is configured to:
            receive an outgoing RT message at the RT port; and
            generate a filtered RT message from the outgoing RT message employing at least one RT message rule; and
         the outgoing line driver is configured to communicate the filtered RT message to the host port;
   where the outgoing RT message is squelched when not in response to the incoming host message from a bus controller.

2. The device according to claim 1, where at least one of the RT port and the host port is configured to interface with at least one of a MIL-STD-1553 data bus and a MIL-STD-1773 data bus.

3. The device according to claim 1, where the host bus is a shared data bus configured to couple with:
   at least one bus controller; or
   the at least one bus controller and at least one additional RT; or
   the at least one bus controller and at least one additional RT and at least one additional device.

4. The device according to claim 1, where the filtered host message comprises at least one of:
   an unmodified incoming host message;
   a squelched incoming host message;
   at least one nulled out non-header data word; and
   a null message.

5. The device according to claim 1, where the filtered RT message comprises at least one of:
   an unmodified outgoing RT message;
   a squelched outgoing RT message;
   at least one nulled out non-header data word; and
   a null message.

6. The device according to claim 1, where at least one of the at least one host message rule and the at least one RT message rule comprises at least one of:
   at least one allowed source identifier;
   at least one disallowed source identifier;
   at least one allowed destination identifier;
   at least one disallowed destination identifier; and
   at least one disallowed header datum.

7. The device according to claim 1, where at least one of the at least one host message rule and the at least one RT message rule is programmable.

8. The device according to claim 1, where at least one of the incoming message filter, the incoming line driver, the outgoing message filter and the outgoing line driver employs a circuit comprising at least one of:
   a programmable processor;
   a Field Programmable Gate Array (FPGA); and
   an Application Specific Integrated Circuit (ASIC).

9. A method comprising:
   when an incoming host message is received from a data bus:
      generating a filtered host message from the incoming host message employing at least one host message rule; and
      communicating the filtered host message to a remote terminals (RT); and
   when an RT message is received from the RT:
      generating a filtered RT message from an outgoing RT message employing at least one RT message rule; and
   communicating the filtered RT message to the data bus;
   observing initialization messages on the data bus;
   waiting for the RT to respond to at least one of the initialization messages;
   extracting an RT address from at least one of the initialization messages and a RT response; and
   modifying at least one of the at least one host message rule and the at least one RT message rule with the RT address; and
   where at least one of:
      the communicating the filtered host message further comprises initiating the communicating the filtered host message within a first determined period of time following the receiving the incoming message; and
      the communicating the filtered RT message further comprises initiating the communicating the filtered RT message within a second determined period of time following the receiving the outgoing RT message.

10. The method according to claim 9, where the generating the filtered host message further comprises considering at least one of:
   header content of the incoming host message;
   source of the incoming host message;

destination of the incoming host message;
content of the data elements of the incoming host message;
prior message communications, and
contextual data known to the incoming message filter.

11. The method according to claim 9, where the generating the filtered host message further comprises at least one of:
maintaining the incoming host message unmodified;
squelching the incoming host message;
nulling out non-header data words in the incoming host message;
nulling out the incoming host message;
retaining a header unaltered in the incoming host message;
retaining incoming host message data unaltered;
truncating subsequent data elements;
setting data elements to predetermined values; and
transforming data elements employing operational context.

12. The method according to claim 9, where the generating the filtered RT message further comprises considering at least one of:
content of the outgoing RT message header;
the destination of the outgoing message;
content of outgoing RT message data elements;
prior message communications; and
contextual data known to the message filter.

13. The method according to claim 9, where the generating a filtered RT message further comprises at least one of:
maintaining the outgoing RT message unmodified;
squelching the outgoing RT message;
nulling out non-header data words in the outgoing RT message;
nulling out the outgoing RT message;
retaining a header unaltered in the outgoing RT message;
retaining outgoing RT message data unaltered;
truncating subsequent data elements;
setting data elements to predetermined values;
transforming data elements employing operational context; and
nulling the outgoing RT message.

14. The method according to claim 9, where at least one of employing the at least one host message rule and the employing the at least one RT message rule further comprises identifying at least one of:
at least one allowed source identifier;
at least one disallowed source identifier;
at least one allowed destination identifier;
at least one disallowed destination identifier; and
at least one disallowed header datum.

15. The method according to claim 9, further comprising programming at least one of the at least one host message rule and at least one RT message rule.

16. The method according to claim 9, further comprising at least one of logging events and reporting events.

17. A system comprising:
at least one bus controller communicatively coupled to a host bus;
at least one remote terminal (RT); and
at least one data transfer filter comprising:
a host port configured to communicatively couple to the host bus;
a remote terminal (RT) port configured to communicatively couple to the RT;
at least one of:
an incoming message filter and an incoming line driver, wherein:
the incoming filter is configured to:
receive an incoming host message from the host port and
generate a filtered host message from the incoming host message employing at least one host message rule; and
the incoming line driver is configured to communicate the filtered host message to the RT port; and
an outgoing message filter and an outgoing line driver, wherein:
the outgoing message filter is configured to:
receive an outgoing RT message from the RT port and generate a filtered RT message from the outgoing RT message employing at least one RT message rule; and
the outgoing line driver is configured to communicate the filtered RT message to the host port; and
where the outgoing RT message is squelched when not in response to the incoming host message from a bus controller.

18. The system of claim 17, where the host bus is a shared bus.

* * * * *